(12) United States Patent
Hermoso

(10) Patent No.: US 7,357,049 B2
(45) Date of Patent: Apr. 15, 2008

(54) MACHINE FOR MACHINING LARGE PARTS

(75) Inventor: Julian Biagorri Hermoso, Barcelona (ES)

(73) Assignee: Loxin 2002, S.L., Barcelona (ES)

( * ) Notice: Subject to any disclaimer, the term of this patent is extended or adjusted under 35 U.S.C. 154(b) by 701 days.

(21) Appl. No.: 10/476,096

(22) PCT Filed: Mar. 8, 2002

(86) PCT No.: PCT/ES02/00103
§ 371 (c)(1),
(2), (4) Date: May 27, 2004

(87) PCT Pub. No.: WO02/072308
PCT Pub. Date: Sep. 19, 2002

(65) Prior Publication Data
US 2004/0194569 A1 Oct. 7, 2004

(30) Foreign Application Priority Data
Mar. 9, 2001 (ES) .......................... 200100556 U

(51) Int. Cl.
*G05G 11/00* (2006.01)

(52) U.S. Cl. .............................. 74/490.09; 74/490.07; 901/16; 384/9

(58) Field of Classification Search ............. 74/490.07, 74/490.09; 901/16; 384/9
See application file for complete search history.

(56) References Cited

U.S. PATENT DOCUMENTS

| | | | | |
|---|---|---|---|---|
| 5,341,751 A | * | 8/1994 | Cuneo et al. | 108/143 |
| 6,134,981 A | * | 10/2000 | Novak et al. | 74/490.09 |
| 6,320,645 B1 | * | 11/2001 | Inoue et al. | 355/53 |
| 7,141,969 B2 | * | 11/2006 | Guzik | 324/261 |
| 2003/0094058 A1 | * | 5/2003 | Kito | 74/490.09 |

* cited by examiner

*Primary Examiner*—David M. Fenstermacher
(74) *Attorney, Agent, or Firm*—Notaro & Michalos P.C.

(57) ABSTRACT

Machine for machining large parts of the type that comprises a parallel kinematics machining device that moves freely in the X, Y and Z Cartesian axes, characterized in that the said device is mounted on a platform which moves in the Z axis and is in turn mounted on a bridge that slides along corresponding guides in the X and Y axes. The invention put forward affords the significant advantage of combining the high machining precision and speed of the parallel kinematics machine with the fact that the machine can access large work areas owing to the support platform which is mounted on the bridge.

2 Claims, 2 Drawing Sheets

MACHINE FOR MACHINING LARGE PARTS

Figure 1:
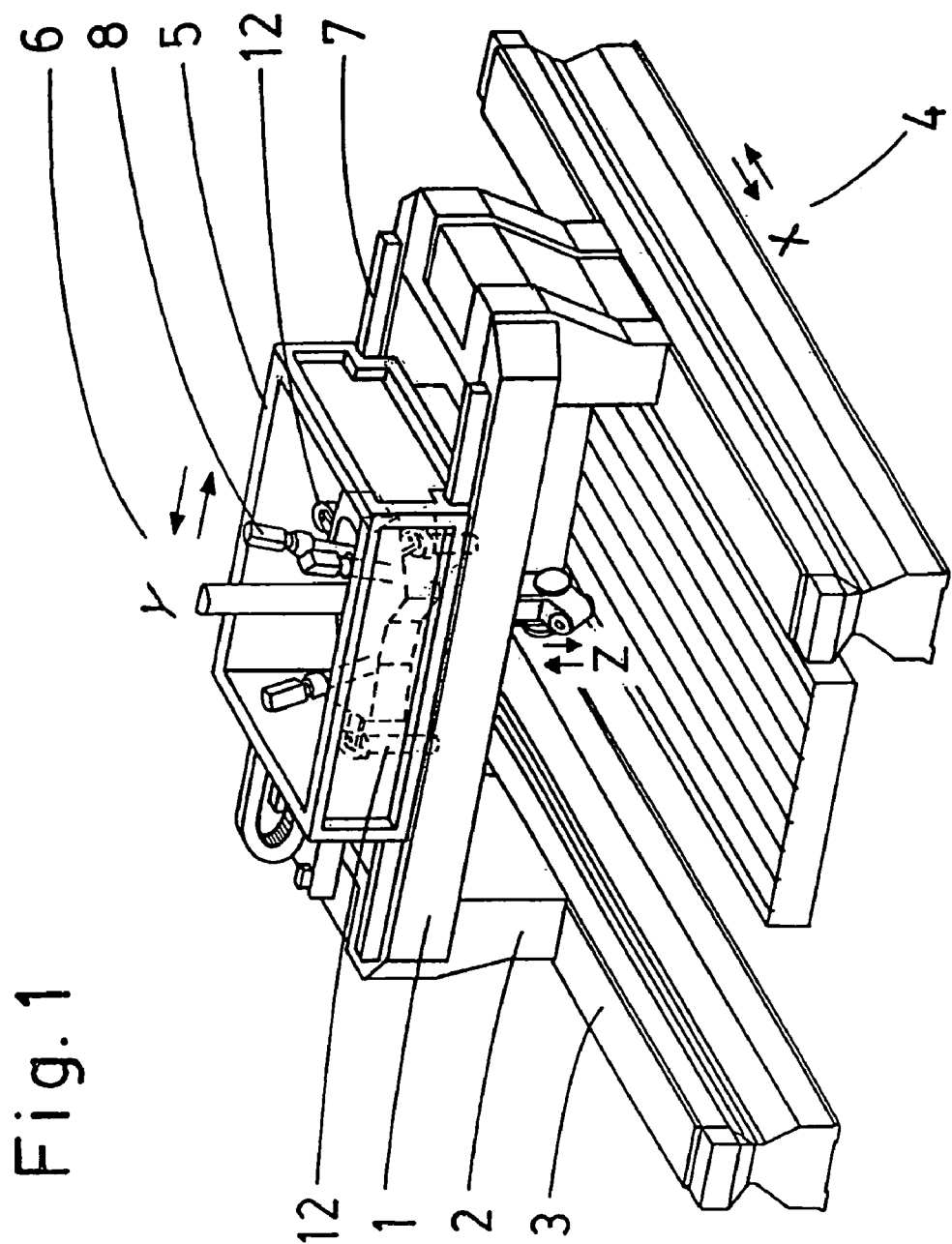

The present descriptive memory refers, as its title indicates, to a machine for machining large parts, of the type that comprises of a bridge that slides along two guides and supports the machining device.

Currently there are several types of machines consisting of a bridge that slides along two guides and is fitted with the device or tool that will act on the part to be machined. These devices or tools are designed to move horizontally, transversely and vertically by means of the aforementioned bridge and the guides, in order to perform the machining tasks they are programmed for.

There are also multiple systems or devices for part machining, commonly known in the industry as parallel kinematics machines (PKM), which allow part machining in a predetermined confined space by means of multiple interpolated axes.

One of the disadvantages presented by machines comprising a bridge and its corresponding guides is that operating speeds and accelerations are low, and that very frequently wide machining tolerances are required due to the lack of resistance to bending caused by certain torsion phenomena.

As for the machines or devices for machining purposes based on the parallel kinematics system, it must be said that although they provide precision and high speed and acceleration, its application scope is limited and consequently this system is not currently used for large parts machining purposes.

To solve the problems currently affecting large parts machining, the machine that is the subject of the present invention has been developed. The machine, based on the three Cartesian axes system -X, Y and Z-, comprises a bridge whose feet slide horizontally -X- along two guides, a sliding platform, fitted on top of the bridge, that moves transversely -Y- in relation to the guides, and a parallel kinematics machine or device for machining purposes, of any of the common types known in the industry, anchored onto this platform. The parallel kinematics device anchored onto the bridge's platform moves upwards and downwards in the -Z- coordinate, activated by any commercial device, for example, actuator cylinders, perpetual screws, racks, etc.

The machine for machining large parts put forward has multiple advantages over the solutions currently used in the industry. The most important one is that the working tool has access to wide work areas by virtue of its movements in coordinates X, Y and Z, plus the total flexibility of movements that the parallel kinematics head has within its own work area.

Another advantage of the present invention is the synchronization of the operation of the parallel kinematics machine with its movements in the X, Y and Z Cartesian axes; in other words, while the parallel kinematics machine works at full speed and acceleration, the Cartesian axes track its movement, making it possible to expand the PKM's work area to the whole Cartesian area of the machine presented here.

Another significant advantage of the machine put forward is its high resistance to bending, which allows a high degree of precision, since the absence of torsion phenomena allows minimum tolerances.

Another important advantage of the present invention is its high operating speed, which obviously significantly reduces machining times and therefore costs.

The final advantage of the machine for machining large parts we will mention is its low manufacturing cost compared to that of other sophisticated machines used in the industry.

To better understand this invention, the optimal assembly is represented in the annexed plan. In this plan:

FIG. -1- shows the present invention in perspective.

Figure 2:
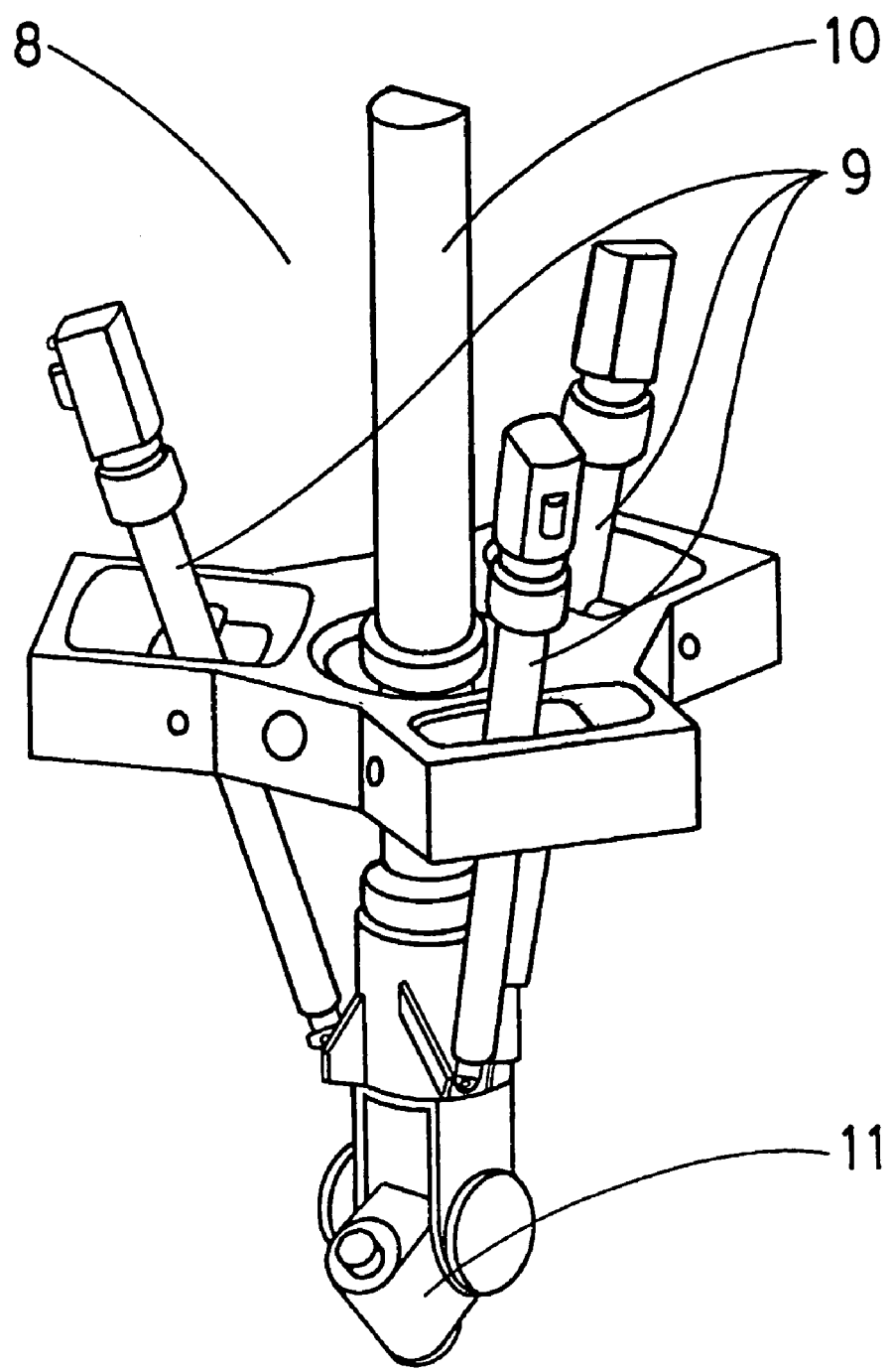

FIG. -2- shows an example of a machine for machining with interpolated axes, of those known as parallel kinematics machine.

The machine for machining large parts put forward incorporates, as can be seen in the figures, a bridge (1) of variable configuration, whose feet (2) slide horizontally along the guides (3), allowing for movements in coordinate X (4).

On top of the bridge (1) there is a platform (5) that travels transversely in relation to the machine's guides (3) by means of its own guides (7), allowing for all possible positions of the platform (5) in relation to coordinate Y (6).

The aforementioned platform (5) of variable configuration is fitted with any type of parallel kinematics machine (8), made of several interpolated axes by means of actuator cylinders (9) and a central spindle (10) at which bottom end there is a head (11) capable of positioning itself in any position according to the actuators' axes (9).

For the upward and downward movements of the parallel kinematics machine (8), that is, its movements in relation to coordinate -Z-, any of the multiple devices currently known in the industry are used, for example, actuator cylinders (12), perpetual screws, racks, etc.

For the control of the machine, there is a computing unit that will control and synchronize all the movements within the Cartesian area, while the head (11) of the parallel kinematics machine (8) will be positioned automatically at the appropriate work points.

A detailed description of the rest of the mechanics of the machine is expressly omitted; as it is not the subject of any claim.

Now that the nature of this invention and the optimal way to manufacture it have been sufficiently described, it only remains to be said that such description is not restrictive, and it is possible to introduce changes, as long as they do not change the essential characteristics claimed hereunder.

The invention claimed is:

1. A machine for machining large parts, comprising: a pair of spaced apart parallel first guides (3) extending in an X Cartesian coordinate direction; a mobile bridge (1) extending over the first guides in a Y Cartesian coordinate direction and mounted to the first guides for movement of mobile bridge in the X Cartesian coordinate direction; a pair of spaced apart parallel second guides (7) connected on the mobile bridge and extending in a Y Cartesian coordinate direction; a platform (5) mounted to the second guides on top of the bridge (1), for movement in the Y Cartesian coordinate direction; a parallel kinematics machine (8) comprising a plurality of interpolated axes (9) each with a lower end, and a head (11) connected to a lower end of the interpolated axes for movement of the head by the interpolated axes, the parallel kinematics machine being mounted to the platform for movement in a Z Cartesian coordinate direction; and an actuator (12) connected to the platform for moving the parallel kinematics machine in the Z Cartesian coordinate direction, so that the parallel kinematics machine is movable in all of the X, Y and Z orthogonal Cartesian coordinate directions.

2. A machine for machining large parts according to claim 1, including a computing control unit for synchronizing the X, Y and Z Cartesian coordinate direction movements of the bridge, and platform and the parallel kinematics machine.

* * * * *